US010153712B2

(12) United States Patent
Wang et al.

(10) Patent No.: US 10,153,712 B2
(45) Date of Patent: Dec. 11, 2018

(54) CIRCULATING CURRENT INJECTION CONTROL

(71) Applicant: Virginia Tech Intellectual Properties, Inc., Blacksburg, VA (US)

(72) Inventors: Jun Wang, Blacksburg, VA (US); Rolando Burgos, Blackburg, VA (US); Dushan Boroyevich, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 15/595,109

(22) Filed: May 15, 2017

(65) Prior Publication Data
US 2018/0331632 A1  Nov. 15, 2018

(51) Int. Cl.
*H02M 7/537* (2006.01)
*H02M 7/539* (2006.01)
*H02M 1/14* (2006.01)
*H02J 5/00* (2016.01)

(52) U.S. Cl.
CPC .............. *H02M 7/539* (2013.01); *H02J 5/00* (2013.01); *H02M 1/143* (2013.01)

(58) Field of Classification Search
CPC .............................. H02M 7/537; H02M 7/539
USPC ......... 363/37, 39–41, 55–56.02, 97–98, 131, 363/132
See application file for complete search history.

(56) References Cited

U.S. PATENT DOCUMENTS

| 7,787,270 | B2 * | 8/2010 | NadimpalliRaju ....... H02J 4/00 363/37 |
| 8,553,432 | B2 * | 10/2013 | Komulainen ......... H02M 5/225 318/599 |
| 8,644,037 | B2 * | 2/2014 | Raju ..................... H02M 5/458 363/37 |
| 9,611,836 | B2 * | 4/2017 | Kurthakoti Chandrashekhara ...... F03D 9/255 |

(Continued)

OTHER PUBLICATIONS

Korn et al, Low output frequency operation of the Modular Multi-Level Converter, Energy Conversion Congress and Exposition (ECCE), Sep. 2010 IEEE, Atlanta, GA, USA.

(Continued)

*Primary Examiner* — Adolf Berhane
*Assistant Examiner* — Nusrat Quddus
(74) *Attorney, Agent, or Firm* — Thomas | Horstemeyer, LLP; Carin R. Miller; Jason M. Perilla

(57) ABSTRACT

In one example, a power converter includes a modular multilevel converter (MMC) electrically coupled between a first power system and a second power system. The MMC includes an arrangement of switching submodules, and the switching submodules include an arrangement of switching power transistors and capacitors. The MMC also includes a controller configured to inject a common mode frequency signal into a circulating current control loop. The circulating current control loop is relied upon to reduce at least one low frequency component in power used for charging the capacitors in the switching submodules. By injecting the common mode frequency signal into the circulating current control loop, the switching submodules can be switched at higher frequencies, the capacitances of the capacitors in the MMC can be reduced, and the power density of the MMC can be increased.

13 Claims, 6 Drawing Sheets

(56) References Cited

U.S. PATENT DOCUMENTS

| | | | |
|---|---|---|---|
| 9,755,497 B2* | 9/2017 | Townsend | H02M 1/084 |
| 9,825,545 B2* | 11/2017 | Chen | H02M 3/33546 |
| 2013/0051103 A1* | 2/2013 | Roscoe | H02M 7/53871 |
| | | | 363/131 |
| 2013/0235628 A1* | 9/2013 | Dong | H02M 7/797 |
| | | | 363/47 |
| 2014/0063874 A1* | 3/2014 | Liu | H02M 1/14 |
| | | | 363/40 |
| 2014/0139167 A1* | 5/2014 | Steimer | H02M 1/126 |
| | | | 318/494 |
| 2014/0211521 A1* | 7/2014 | Mazumder | H02M 7/48 |
| | | | 363/40 |
| 2014/0362623 A1* | 12/2014 | Farkas | H02J 3/32 |
| | | | 363/97 |
| 2016/0146192 A1* | 5/2016 | Kurthakoti Chandrashekhara et al. | F03D 9/003 |
| | | | 290/44 |
| 2017/0187276 A1* | 6/2017 | Townsend | H02M 1/084 |
| 2017/0250533 A1* | 8/2017 | de Jesus Cardoso Filho | H02J 3/01 |
| 2018/0054140 A1* | 2/2018 | Chen | H02M 7/70 |

OTHER PUBLICATIONS

Ferreira, Jan A., The Multilevel Modular DC Converter, IEEE Transactions on Power Electronics, vol. 28, No. 10, Oct. 2013.

* cited by examiner

CIRCULATING CURRENT INJECTION CONTROL

BACKGROUND

A modular multilevel converter (MMC) is a transformerless power converter suitable for use in high- or medium-voltage power conversion applications. MMCs include multiple switching submodules each having a floating, power-storing capacitor, and an arrangement of one or more switching power transistors. In the control of an MMC, it is necessary to individually voltage-balance and control the floating capacitors in the switching submodules. The switching submodules can be constructed using various configurations of switching power transistors, such as half bridge and full bridge topologies, among others. To control the output of an MMC, the switching power transistors can be controlled using switching control signals generated by an MMC controller.

A significant amount of research has been conducted to mitigate various problems with MMC control, including the reduction of voltage ripple on the capacitors in the switching submodules. Some methods are relatively unsuitable for certain applications, however, for various reasons.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Modular multilevel converters (MMC) can be used to convert between direct current (DC) and alternating current (AC) systems, for example, at relatively high voltages without the use of a transformer. Because of their flexibility and relatively small size, MMCs are an attractive solution for high voltage, high power applications. Transformerless unidirectional or bidirectional AC-DC interface power converter systems have been proposed, for example, to connect DC nanogrids to AC utility grids. Compared with isolated topologies, the non-isolated topology of transformerless AC-DC interface power converter systems is relatively simple and generally more efficient. One of the challenges of using an MMC for these applications can be to minimize the size of capacitors in the switching submodules of the MMC. The conventional approach of using large capacitances in the switching submodules increases the volume and cost of MMCs.

In the context outlined above, aspects of circulating current injection control for high speed switching MMCs are described herein. In one embodiment, a power converter includes a modular multilevel converter (MMC) electrically coupled between a first power system and a second power system. The MMC includes an arrangement of switching submodules, and the switching submodules include an arrangement of switching power transistors and capacitors. The MMC also includes a controller configured to inject a common mode frequency signal into a circulating current control loop. The circulating current control loop is relied upon to reduce at least one low frequency component in power used for charging the capacitors in the switching submodules. By injecting the common mode frequency signal into the circulating current control loop, the switching submodules can be switched at higher frequencies, the capacitances of the capacitors in the MMC can be reduced, and the power density of the MMC can be increased.

Figure 1:
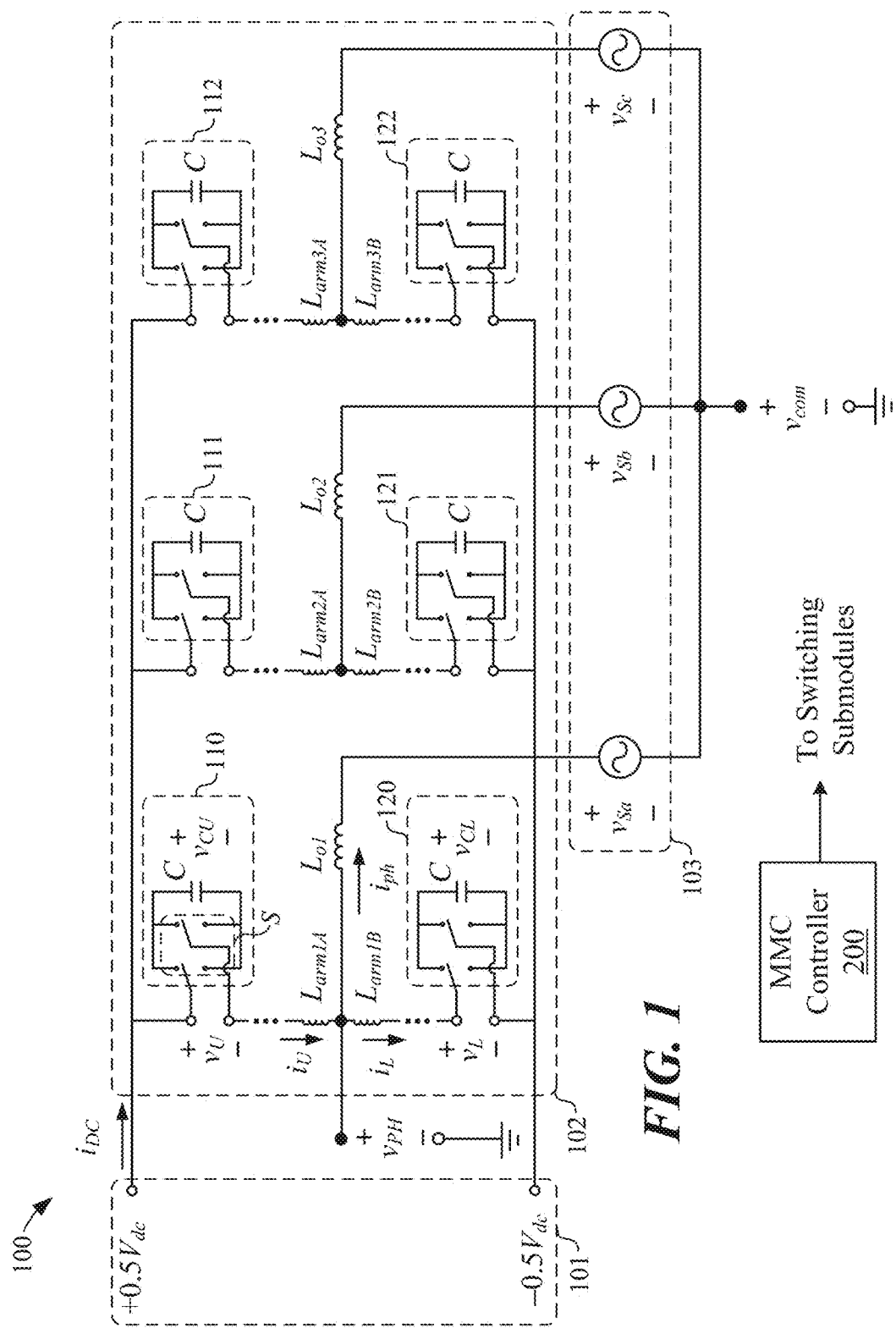
FIG. 1 illustrates an example power converter system including a modular multilevel converter according to various examples described herein.

Turning to the drawings, FIG. 1 illustrates an example power converter system 100 including a modular multilevel converter according to various examples described herein. The power converter system 100 includes a direct current (DC) power grid or system 101, an MMC 102, and an alternating current (AC) power grid or system 103. The MMC 102 can convert high DC voltages from the power system 101 into high AC voltages for the power system 103 without a transformer. FIG. 1 illustrates a representative example of the way an MMC can be used to convert power between two different power grids or systems. In other cases, the MMC 102 can convert power between two different AC power systems, two different DC power systems, or other combinations of AC and/or DC power systems.

As shown in FIG. 1, the MMC 102 includes upper switching submodules 110-112 and lower switching submodules 120-122. The MMC 102 also includes a number of arm inductors $L_{arm1A}$ and $L_{arm1B}$ elegy electrically coupled between the upper switching submodule 110 and the lower switching submodule 120, with a first output tap (i.e., for $v_{Sa}$) of the AC power grid or system 103 taken between the arm inductors $L_{arm1A}$ and $L_{arm1B}$. An output inductor $L_{o1}$ is electrically coupled between the arm inductors $L_{arm1A}$ and $L_{arm1B}$ and the first output tap of the AC power grid or system 103. Similarly, a number of arm inductors $L_{arm2A}$ and $L_{arm2B}$ are electrically coupled bet ween the upper switching submodule 111 and the lower switching submodule 121, with a second output tap (i.e., for $v_{Sb}$) of the AC power grid or system 103 taken between the arm inductors $L_{arm2A}$ and $L_{arm2B}$. An output inductor $L_{o2}$ is electrically coupled between the arm inductors $L_{arm2A}$ and $L_{arm2B}$ and the second output tap of the AC power grid or system 103. Additionally, a number of arm inductors $L_{arm3A}$ and $L_{arm3B}$ are electrically coupled between the upper switching submodule 112 and the lower switching submodule 122, with a third output tap (i.e., for $v_{Sc}$) of the AC power grid or system 103 taken between the arm inductors $L_{arm3A}$ and $L_{arm3B}$. An output inductor $L_{o3}$ is electrically coupled between the arm inductors $L_{arm3A}$ and $L_{arm3B}$ and the third output tap of the AC power grid or system 103.

Although not shown in FIG. 1, each of the upper switching submodules 110-112 and the lower switching submodules 120-122 can include a cascaded (e.g., series) arrangement of switching modules. For example, two, three, or more upper switching submodules similar to the upper switching submodule 110 can be electrically coupled together in a series or cascade arrangement to feed power to the a first output tap (i.e., for $v_{Sa}$) of the AC power grid or system 103. Similarly, two, three, or more lower switching submodules similar to the lower switching submodule 120 can be electrically coupled together in a series or cascade arrangement to feed power to the first output tap of the AC power grid or system 103. Additionally, the upper switching submodules 111 and 112 can be embodied as a series or cascade arrangement of upper switching submodules, and the lower switching submodules 121 and 122 can be embodied as a series or cascade arrangement of lower switching submodules.

Each of the switching submodules 110-112 and 120-122 includes an arrangement of switching power transistors S and capacitors C. The switching power transistors S in the switching submodules 110-112 and 120-122 can be embodied as any suitable type of semiconductor (or other) power switches, such as power bipolar transistors or power insulated gate bipolar transistors (IGBTs), among others, depending upon the switching frequency of the MMC 102 and other factors. However, certain semiconductor power switches, such as IGBTs, may not be suitable for use at higher speed switching frequencies. For higher speed switching operations according to aspects of the embodiments described herein, the switching submodules 110-112 and 120-122 can be embodied as metal oxide semiconductor field effect transistors (MOSFETs), such as silicon carbide (SiC) MOSFETs. In any given switching submodule 110-112 and 120-122, the topology or arrangement of the switching power transistors S can be full bridge, semi full bridge, half bridge, or another topology or arrangement.

The MMC 102 also includes an MMC controller 200. To convert and transfer power between the DC power grid or system 101 and the AC power grid or system 103, the MMC controller 210 is configured to generate switching control signals to switch the switching power transistors S in the switching submodule 110-112 and 120-122 on and off and, thus, charge and discharge the capacitors C in the switching submodule 110-112 and 120-122. As described in further detail below, the MMC controller 200 can be embodied in the form of hardware, firmware, software executable by hardware, or any combination thereof.

As discussed in further detail below with reference to FIG. 3, the MMC controller 200 can include one or more proportional-integral (PI) and proportional-resonant (PR) controllers in a control feedback loop. The MMC controller 200 is configured to continuously calculate certain error values as differences between desired operating characteristics of the MMC 102 and measured operating characteristics of the MMC 102, such as the values of $i_U$, $i_L$, $V_{dc}$, $v_{com}$, $v_{PH}$, and $i_{PH}$ among others, as described below. Using the error values, the MMC controller 200 can generate the switching control signals for the switching power transistors S in the switching submodules 110-112 and 120-122. Further, the PR controller in the MMC controller 200 is configured to inject a common mode frequency signal into a circulating current control loop of the MMC controller 200 as described below.

The amount of capacitor voltage ripple (and frequency components in the ripple) in the capacitors C of the switching submodules 110-112 and 120-122 of the MMC 102 is a relatively important factor when designing and evaluating power converter systems for high voltage, high power applications. High voltage consumer, scientific, medical, military, and industrial applications often require stable, well-regulated output voltages. The amount of capacitor voltage ripple is additionally important when a DC grid is interconnected with an AC grid using a transformerless AC-DC interface converter, for example, for transmission over a high-voltage AC network or grid after conversion from a high-voltage DC transmission system.

Especially under load conditions, the capacitors C in the switching submodules 110-112 and 120-122 experience power fluctuations causing capacitor voltage ripple including various frequency components. To suppress these fluctuations, relatively large capacitors can be selected for use in the switching submodules 110-112 and 120-122. The use of large capacitors, however, increases the volume and cost of the MMC 102.

Figure 2A:
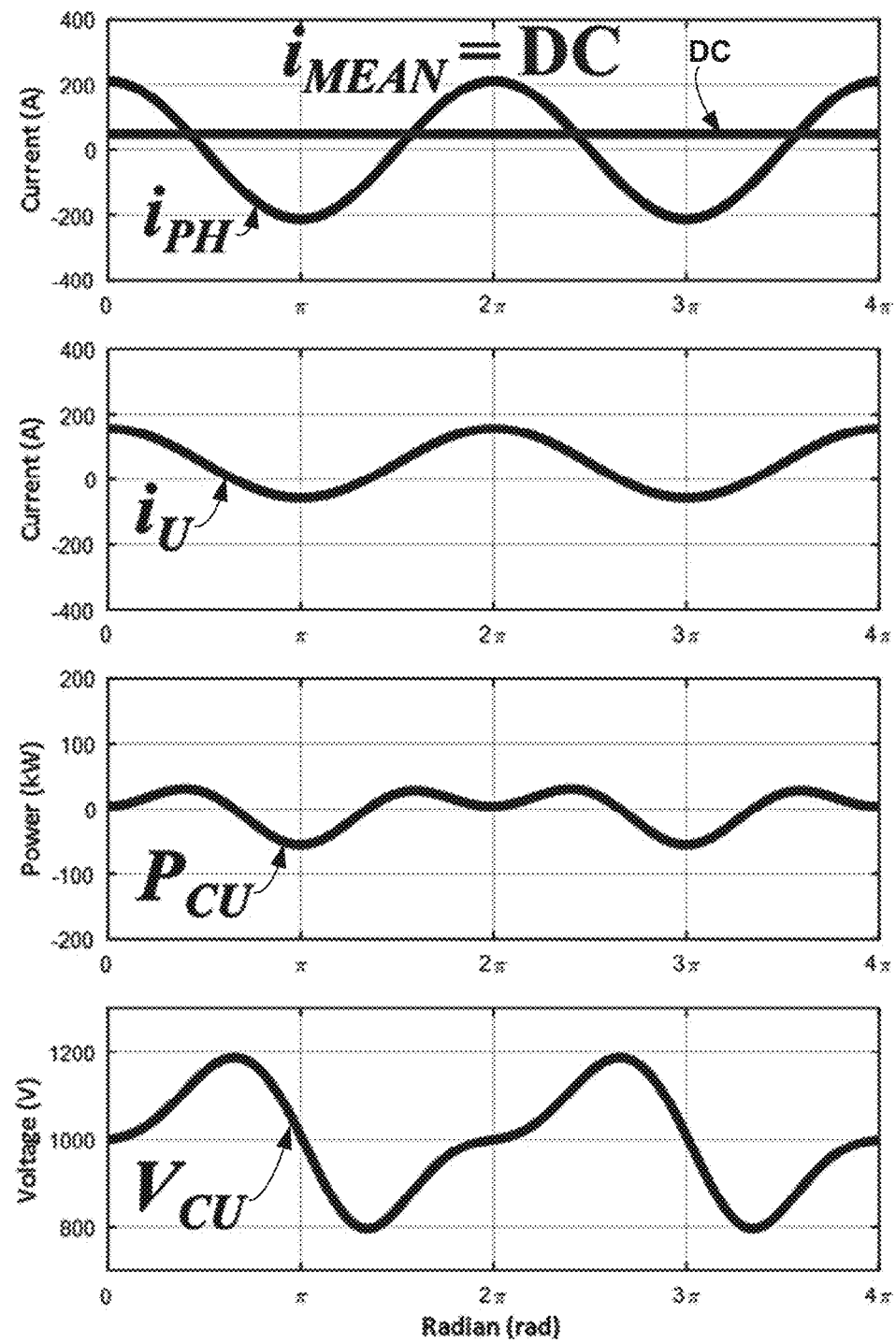
FIG. 2A illustrates an example of power fluctuations in capacitors of switching submodules in a modular multilevel converter according to various examples described herein.

The conventional operating mode of the MMC 102 requires that the capacitors in the switching submodules 110-112 and 120-122 buffer power fluctuations at the fundamental (switching) and second order harmonic frequencies. The need to buffer power fluctuations can prevent the MMC 102 from being widely used in high and medium voltage industrial and other applications. The first drawback in buffering power fluctuations in the capacitors C is that the capacitor voltage ripple can only be balanced after one fundamental cycle, as shown in FIG. 2A, which results in the need for very large capacitors (e.g., with large values of capacitance) for high phase current applications. Thus, when buffering power fluctuations, the MMC 102 stores a significant amount of reactive energy in the capacitors C. This significant amount of reactive energy contributes little to active power delivery, and also results in low power density and high cost for the capacitors C of the MMC 102.

Figure 2B:
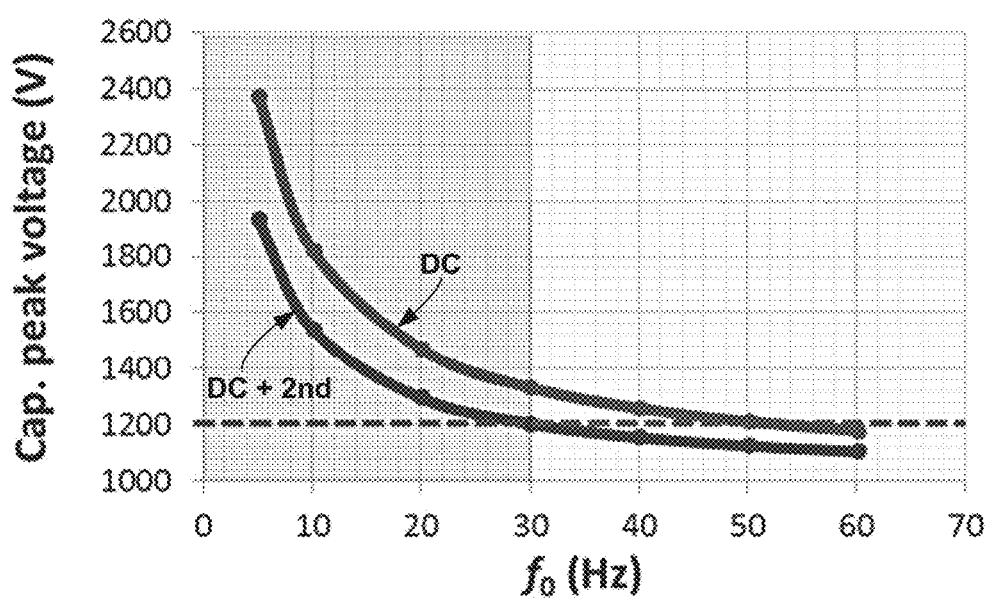
FIG. 2B illustrates an example of how the magnitude of capacitor voltage ripple in switching submodules increases at zero phase current frequency according to various examples described herein.

In addition to the first drawback, a second drawback is that the magnitude of the capacitor voltage ripple in the capacitors C increases with decreasing phase current frequencies and will approach infinity at zero phase current frequency as shown in FIG. 2B. This brings about problems in variable frequency drive applications, particularly at either the start of a motor where phase current frequency grows from zero or in operating modes where continuous high-torque delivery is needed at low frequencies.

Figure 2C:
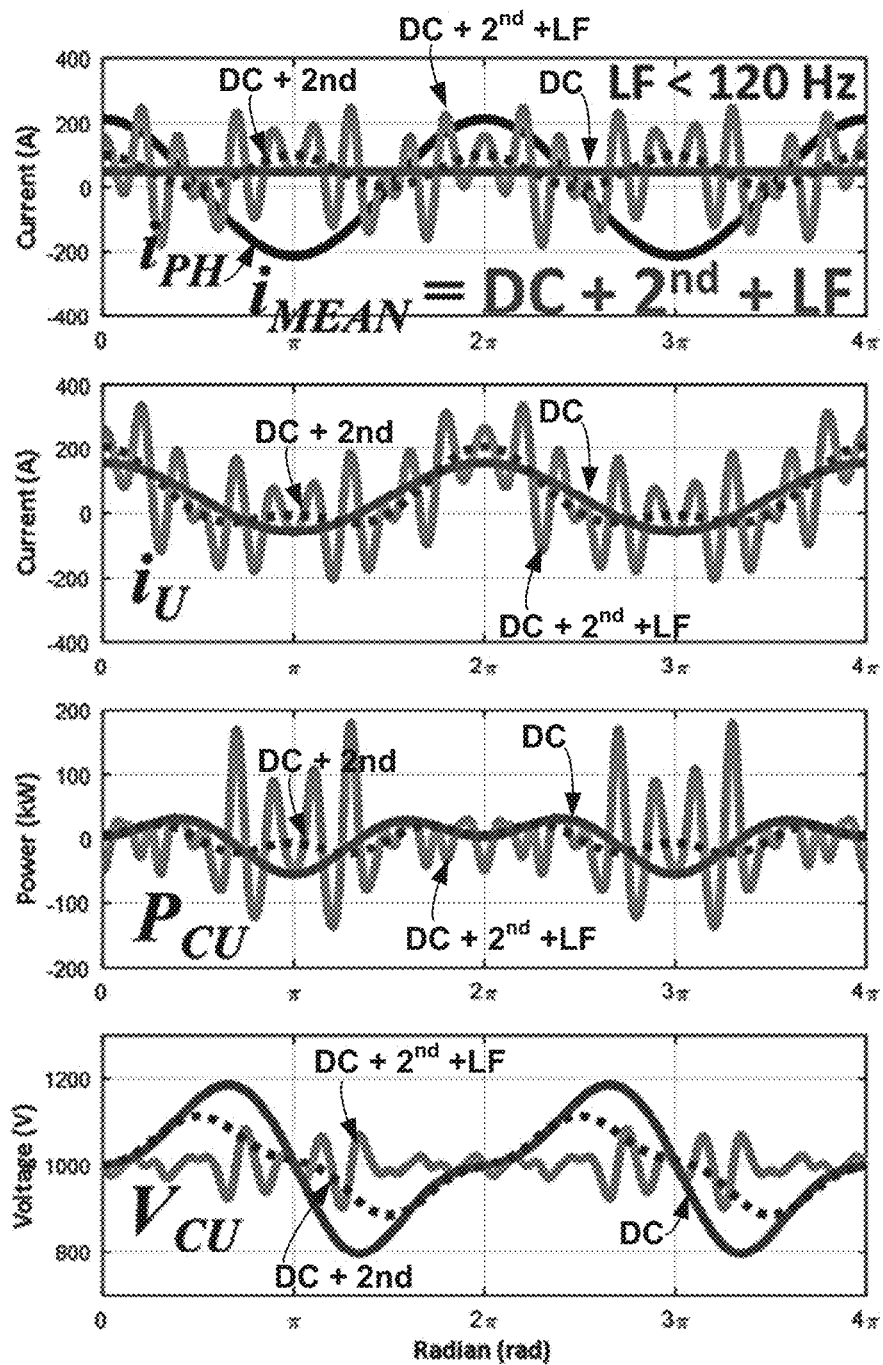
FIG. 2C illustrates an approach to inject high frequency sinusoidal circulating currents and add high frequency common mode voltages during low frequency operation in a modular multilevel converter according to various examples described herein.

Certain approaches to shift arm power in the switching submodules 110-112 and 120-122 towards higher frequencies and, therefore, reduce the energy ripple magnitude have been proposed. One approach is to inject high frequency sinusoidal circulating currents and add high frequency common mode voltages during low frequency operation of the MMC, as shown in FIG. 2C. In that approach, control references can be derived for both the injection current and the common mode voltage control. However, the frequency of injected modulating current is too low (e.g., <100 Hz) to reduce passive component sizes when the line frequency was nominal (e.g., 60 Hz). In order to push to higher injection frequencies (e.g., >1 kHz) to significantly increase power density, faster switching (e.g., >10 kHz) semiconductor devices are required. Conventional IGBT devices cannot achieve such high switching frequencies, however, due to high switching losses at high currents. In other approaches, the concept of high-frequency circulating current injection have been proposed, but without demonstrating the architecture of the control loop.

According to the embodiments described herein, an MMC converter control approach is proposed to decrease the size of passive components (e.g., the capacitors C) of an MMC by reducing or nearly eliminating certain low frequency components in the capacitors C and output of the MMC. The approach is not only directed to low line frequencies (e.g., <60 Hz), but can be extended to use for higher-frequency conversion designs. To achieve various aspects of the embodiments, a common-mode signal $\omega_{COM}$, which can be relatively high (e.g., 10 times or more than the fundamental frequency), is injected into the circulating current control loop of an MMC controller, and faster switching semiconductor devices can be used in an MMC. The common-mode signal $\omega_{COM}$ can be pushed to 10 kHz or higher in some cases, and the switching frequency can be pushed to 30 kHz or higher, for 1.7-kV, 325-A SiC MOSFET modules, for example.

Figure 3:
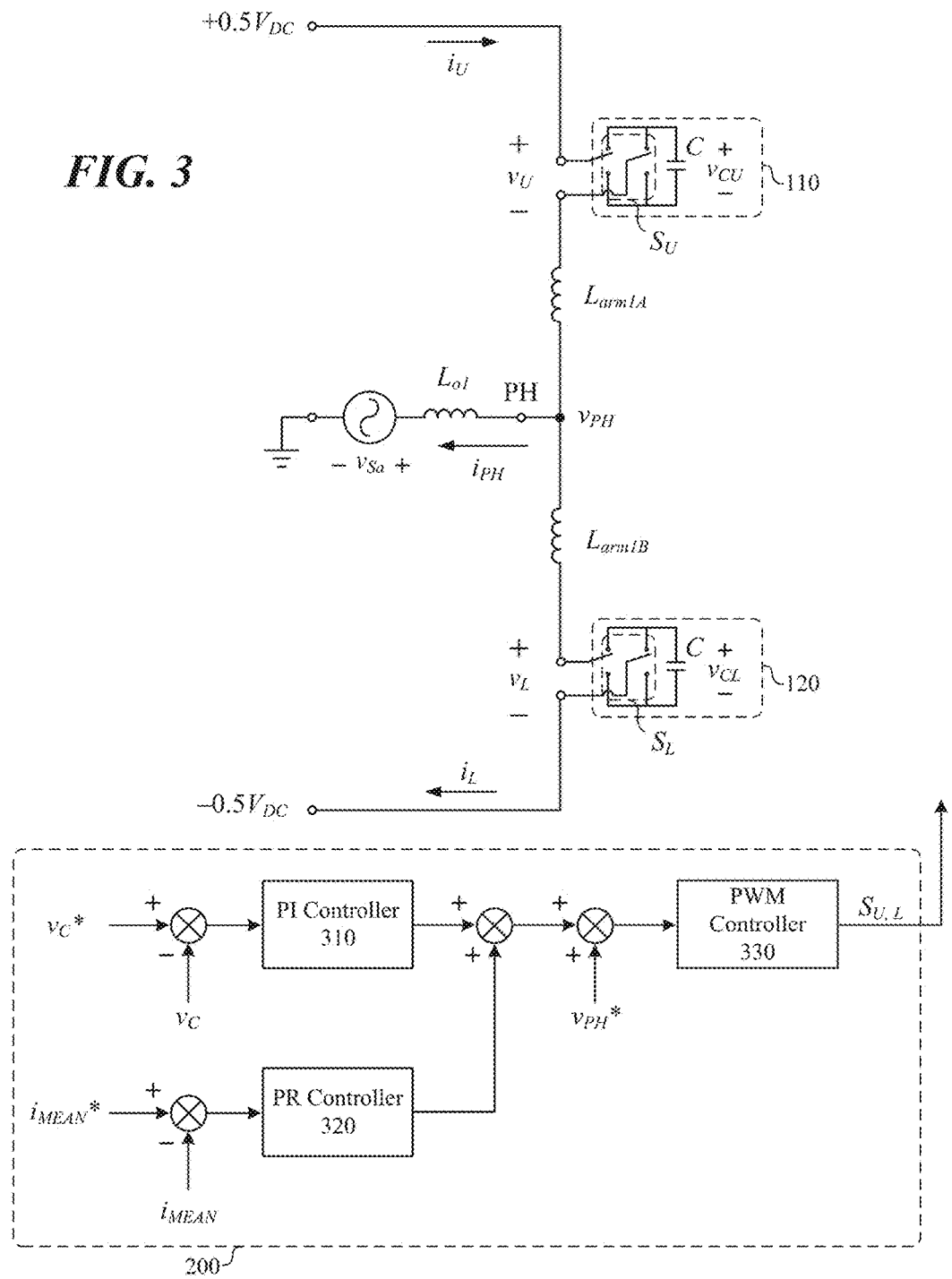
FIG. 3 illustrates an example leg of the modular multilevel converter shown in FIG. 1, including control notation, according to various examples described herein.

To further describe aspects of the embodiments, FIG. 3 illustrates an example leg of the MMC 102 shown in FIG. 1, including control notation. FIG. 3 also illustrates an expanded view of the MMC controller 200. The MMC controller 200 includes a PI controller 310, a PR controller 320, and a pulse width modulation (PWM) controller 330. The PI controller 310, PR controller 320, and pulse width modulation (PWM) controller 330 can be embodied in the form of hardware, firmware, software executable by hardware, or any combination thereof.

The PI controller 310 is configured to calculate an error value output based on a difference between the $v_c$ and $v_c^*$ inputs using proportional and integral terms. The PI controller 310 seeks to minimize the error over time by adjustment of the error value output over time. The PI controller 310 is not particularly suitable to follow a sinusoidal reference without steady state error due to the integral term. The PR controller 320 is more suitable for operates with sinusoidal references.

The PR controller 320 is configured to provide gain at certain frequencies (e.g., resonant frequencies) and no (or less) gain at other frequencies. As shown in FIG. 3, the outputs of the PI controller 310 and the PR controller 320 are summed and provided as a control input to the PWM controller 330. The PWM controller 330 is configured to generate the switching control signals $S_U$ and $S_L$ for the switching power transistors in the switching submodules 110 and 120, among others.

In FIG. 3, the current and voltage variables described in the equations below are identified. For the MMC controller 200, the control target $i_{MEAN}$ is defined in Equation (1) below. The reference of $i_{MEAN}$ is $i_{MEAN}^*$, as expressed in Equation (2). The three-phase common-mode voltage $v_{COM}$ is defined in Equation (3). To use a switching frequency of 100 kHz or higher, so that SiC MOSFET switching transistors can be used in the switching submodules 110 and 120 (among others) of the MMC 102, the common-mode frequency signal $\omega_{COM}$ can be injected into the common-mode voltage at a frequency as high as (or possibly higher than) 5 kHz, as one example.

$$i_{MEAN} = \frac{i_U + i_L}{2} \quad (1)$$

$$i_{MEAN}^* = \frac{v_{PH} i_{PH}}{V_{DC}} + \sqrt{2} \, i_{PH} \frac{\frac{V_{DC}}{4} - \frac{v_{PH}^2}{V_{DC}}}{V_{COM\_RMS}} \cos(\omega_{COM} t) \quad (2)$$

$$v_{COM} = \sqrt{2} \, V_{COM\_RMS} \cos(\omega_{COM} t) \quad (3)$$

-continued $$PR(s) = k_P + \frac{k_{R1}}{s^2 + (2\omega_0)^2} + \frac{k_{R2}}{s^2 + \omega_{COM}^2} \quad (4)$$

To achieve the advantages of the embodiments, the PR controller 320 is configured to regulate a number of different harmonics according to Equation (4) to control $i_{MEAN}$ so that it follows the reference $i_{MEAN}^*$ given in Equation (2). As the target frequency components that need to be controlled in $i_{MEAN}$ are DC, the 2nd-order harmonic of the line frequency $\omega_0$ (e.g., $2\omega_0$), and the injected common mode frequency $\omega_{COM}$, the PR controller 320 is configured to increase the gain in those three frequencies.

The PR controller 320 can control the DC component to be equal to the first term in Equation (2). The PR controller 320 can also control the injected common-mode signal $\omega_{COM}$ to be equal to the second term in Equation (2). Additionally, the PR controller 320 can control the 2nd-order harmonic component $\omega_0$ to zero. The proportional gain term $k_P$ and the resonant gain terms $k_{R1}$ and $k_{R2}$ in Equation (4) can be selected to ensure the MMC 102 has suitable dynamic response performance, such as suitable bandwidth, phase, and gain margin.

Figure 4:
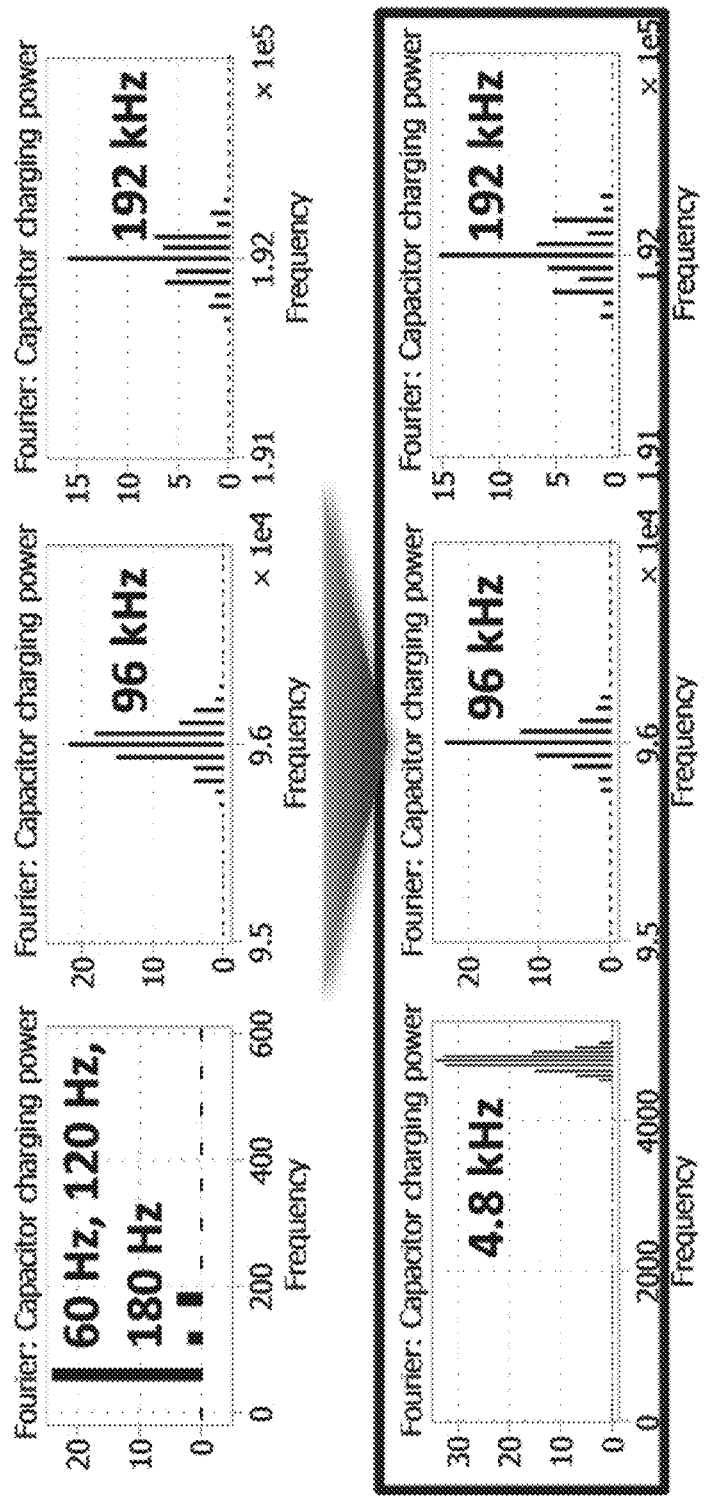
FIG. 4 illustrates the effectiveness of the high frequency injection method according to various examples described herein.

The effectiveness of the high frequency injection method is shown in FIG. 4. The top three harmonic spectrums are produced from an FFT analysis of the mean current in the conventional mode of operation of the MMC 102. In the conventional mode, the mean current of the MMC 102 exhibits low frequency components of 60 Hz, 120 Hz (2nd-order), and 180 Hz (3rd-order). It also exhibits the high frequency components of 96 kHz (e.g., the switching frequency), the side-band frequency of the switching frequency, and the harmonic components of the switching frequency.

Thus, the current flowing through the capacitors C in the switching submodules 110-112 and 120-122 includes the low frequency component, leading to the need for large sizes of the capacitors C. With the proposed high-frequency injection control method described herein, the low frequency components have been eliminated as shown in the bottom three harmonic spectrums shown in FIG. 4. The dominant frequency is the injected common-mode frequency of 4.8 kHz, which determines the capacitance value and size of the capacitors C.

The MMC controller 200 be extended for use with MMCs including any number of switching submodules connected in series in the MMC arms. In other words, the MMC controller 200 can be extended for use with a cascaded (e.g., series) arrangement of any number of switching modules in one or more arms of the MMC 102 shown in FIG. 1.

The components described herein, including the MMC controller 200 can be embodied in the form of hardware, firmware, software executable by hardware, or as any combination thereof. If embodied as hardware, the components described herein can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs)), or complex programmable logic devices (CPLDs)), among other types of processing circuitry.

The microprocessors, microcontrollers, or DSPs, for example, can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter, comprising:
    a modular multilevel converter (MMC) electrically coupled between a first power system and a second power system, the MMC comprising:
        an arrangement of switching submodules, at least one of the switching submodules comprising an arrangement of switching power transistors and capacitors, the switching power transistors comprising high-current, high-frequency medium-voltage semiconductor switches; and
        a controller comprising a proportional-integral control loop and a proportional-resonant control loop, the controller being configured to inject a high frequency common mode signal into a circulating current control loop of the MMC, wherein:
        based on the high frequency common mode signal injected into the circulating current control loop, the controller is configured to switch the switching power transistors at a higher frequency to reduce at least one low frequency component in power used for charging the capacitors and increase a power density of the MMC; and
        the controller is configured to inject the high frequency common mode signal into the circulating current control loop of the controller to reduce a magnitude of voltage ripple in the capacitors.

2. The power converter according to claim 1, wherein a size of the capacitors can be reduced based on a reduction of the magnitude of voltage ripple in the capacitors.

3. The power converter according to claim 1, wherein the high frequency common mode signal is injected into a circulating current reference used by the proportional-resonant control loop.

4. The power converter according to claim 1, wherein the proportional-resonant control loop is configured to increase a gain associated with at least one of a direct current (DC) component, a harmonic line frequency component, or a common mode frequency component of a circulating current in the MMC.

5. The power converter according to claim 1, wherein:
    the first power system comprises a direct current (DC) power system; and
    the second power system comprises an alternating current (AC) power system.

6. The power converter according to claim 1, wherein the switching power transistors comprise silicon carbide (SiC) metal oxide semiconductor field effect transistors (MOSFETs).

7. A power converter, comprising:
    a modular multilevel converter (MMC) electrically coupled between a first power system and a second power system, the MMC comprising:
        a leg comprising a cascade arrangement of switching submodules, at least one of the switching submodules comprising an arrangement of switching power transistors and capacitors, the switching power transistors comprising high-current, high-frequency medium-voltage semiconductor switches; and
        a controller comprising a proportional-integral control loop and a proportional-resonant control loop, the controller being configured to inject a high frequency common mode signal into a circulating current control loop of the MMC, wherein:
        based on the high frequency common mode signal injected into the circulating current control loop, the controller is configured to reduce at least one low frequency component in power used for charging the capacitors; and
        the controller is configured to inject the high frequency common mode signal into the circulating current control loop of the controller to reduce a magnitude of voltage ripple in the capacitors.

8. The power converter according to claim 7, wherein a size of the capacitors can be reduced based on a reduction of the magnitude of voltage ripple in the capacitors.

9. The power converter according to claim 7, wherein, based on the high frequency common mode signal injected into the circulating current control loop, the controller is configured to switch the switching power transistors at a higher frequency to reduce the at least one low frequency component in power used for charging the capacitors.

10. The power converter according to claim 7, wherein the high frequency common mode signal is injected into a circulating current reference used by the proportional-resonant control loop.

11. The power converter according to claim 7, wherein the proportional-resonant control loop is configured to increase a gain associated with at least one of a direct current (DC) component, a harmonic line frequency component, or a common mode frequency component of a circulating current in the MMC.

12. The power converter according to claim 7, wherein:
    the first power system comprises a direct current (DC) power system; and
    the second power system comprises an alternating current (AC) power system.

13. The power converter according to claim 7, wherein the switching power transistors comprise silicon carbide (SiC) metal oxide semiconductor field effect transistors (MOSFETs).

* * * * *